Patented May 21, 1929.

1,713,580

UNITED STATES PATENT OFFICE.

HARRY M. WILLIAMS, OF DAYTON, OHIO, ASSIGNOR TO GENERAL MOTORS RESEARCH CORPORATION, OF DAYTON, OHIO, A CORPORATION OF DELAWARE.

PROCESS OF PRODUCING HIGH-HEAT-RESISTING SUBSTANCES.

No Drawing. Application filed January 10, 1925. Serial No. 1,579.

This invention relates to a process of making refractory substances and compositions adapted for use where low heat conductivity, high temperature resistance and superior strength are required.

It involves substances composed in whole or in part of a refractory material of exceedingly fine or impalpable particles cohering into an integral mass and the process of producing such substances.

In seeking a satisfactory material for lining metal molds to receive molten metal of relatively high melting point, such as iron, steel and brass, it was discovered that if some refractory material were reduced to fine impalpable particles, these particles could be caused to cohere, if subjected to heat much below their melting points, rendering the use of a binder unnecessary. So by the intermixture of a quantity of these impalpable powders of refractories with coarser particles, furnace and crucible linings, high heat resisting blocks can be formed without the use of binders, which have the effect of reducing the melting point of the body in which it is used.

In producing these very fine powders of refractories the refractory material may first be granulated by grinding into particles of sufficient fineness to pass through a 100-mesh sieve. The granulated product of the first grinding may then be introduced into a ball or pebble mill together with water and a deflocculating agent and again ground for a period of from six to twelve hours or more, until the refractory material becomes reduced to an exceedingly fine powder consisting, in whole or in part, of impalpable particles resembling fine grades of clay, after they have been pugged and tempered.

Among refractory materials that have given good results are magnesite, zirconia, silica, alumina and thoria; and among the deflocculating agents used successfully are the alkaline substances, caustic soda, soda ash, borax and water glass and such acid materials as tannic acid.

The fine particles of refractory material produced in the manner described may be mixed with coarser particles of the same or some other refractory substance or substances, and may be molded, tamped, formed or applied in a more or less moist condition against the furnace or crucible wall or other place where it is to be used. Or it may be so applied without the addition of said coarser particles where a particularly smooth surface is required, as in linings for permanent molds. Or the fine refractory material with or without admixture of coarser particles may be formed into bricks or blocks and built into the structure to be lined, if the material is to be used as a heat resisting lining. After formation of the so-produced material as linings or as blocks or other articles, it should be heated to a temperature of 1100° F. more or less, until the said impalpable particles become sintered or otherwise aggregated, thereby binding the coarser particles, if such have been included, into an integral coherent mass, or, if not mingled with coarser particles, solidified into a mass of fine firm texture.

The deflocculating agents act in no sense as binders. Their only function is to promote the reduction of the refractory substance during the final grinding. No binder whatever is used to effect adhesion or cohesion of the particles of the product. The exceedingly fine particles of refractory constitute, as it were, a self-binding material; these particles sinter together and cohere during heating. This fact is of great value in refractory linings, since it enables them to be made without binders, which yield to high temperatures and make linings in which they are included fragile or reduce their melting points. There is no reduction of the melting point of linings made in accordance with this invention below that of the refractory ingredients and the melting points of the refractories are very much higher than those of iron, steel, brass and other metals that are commonly cast. It may be emphasized that it is the exceedingly fine state of reduction of the refractory that enables the described process to be practiced and the described product to be produced. Coarse particles of refractories do not unite or combine into a solid mass when heat treated; but when reduced to the impalpable particles described refractory materials can be bound into a solid mass by heat treatment.

Marked success has been achieved in the use of a product of the described process in which calcined magnesite has been adopted as the refractory and caustic soda as the deflocculating agent. It may be noted that the fusing point of calcined magnesite is about 5000° F., while the melting points of cast iron and steel are respectively 2250° F. and not substantially higher than 2800° F.

The quantity of deflocculating agent required to achieve satisfactory reduction of the refractory material to the desired degree of fineness may be about one half of one per cent (1/2%) by weight compared with the quantity of refractory material being treated.

While the form of embodiment of the present invention as herein described constitutes a preferred form, it is to be understood that other forms might be adopted, all coming within the scope of the claims which follow.

What is claimed and desired to be secured by Letters Patent is:

1. The process of producing high heat resisting substances consisting in reducing at least a substantial portion of a non-oxidizable refractory material to an impalpable powder in the presence of a deflocculating agent, giving the desired form to a mass of the powdered material and heating the formed mass at such a temperature and for such a period as to cause the particles of the mass to cohere.

2. In the process as defined in claim 1, the refractory material consisting of magnesite and the deflocculating agent being caustic soda.

3. The process of producing high heat resisting substances which consists in grinding particles of a refractory material to an impalpable powder in the presence of a deflocculating agent and water, giving the desired form to a mass of the powdered material and heating the formed mass at such a temperature and for such a period of time as to cause the particles of the mass to cohere.

4. The process of producing high heat resisting substances which consists in grinding particles of a refractory material to an impalpable powder in the presence of water and one-half of 1% of a deflocculating agent by weight compared with the weight of the refractory, giving the desired form to a mass of the powdered material and heating the formed mass at such a temperature and for such a period of time as to cause the particles of the mass to cohere.

In testimony whereof I hereto affix my signature.

HARRY M. WILLIAMS.